United States Patent [19]
Walker

[11] Patent Number: 5,754,867
[45] Date of Patent: May 19, 1998

[54] METHOD FOR OPTIMIZING PERFORMANCE VERSUS POWER CONSUMPTION USING EXTERNAL/INTERNAL CLOCK FREQUENCY RATIOS

[75] Inventor: Gary Walker, Phoenix, Ariz.

[73] Assignee: VLSI Technology, Inc., San Jose, Calif.

[21] Appl. No.: 619,924

[22] Filed: Mar. 20, 1996

[51] Int. Cl.$^6$ .................................................. G06F 1/32
[52] U.S. Cl. ................................... 395/750; 395/559
[58] Field of Search ...................... 395/750, 551–560, 395/550; 364/707

[56] References Cited

U.S. PATENT DOCUMENTS

| | | | |
|---|---|---|---|
| 4,095,267 | 6/1978 | Morimoto | 395/550 |
| 4,893,271 | 1/1990 | Davis et al. | 395/550 |
| 5,086,387 | 2/1992 | Arroyo et al. | 395/550 |
| 5,167,031 | 11/1992 | Watanabe | 395/550 |
| 5,218,704 | 6/1993 | Watts, Jr. et al. | 395/750 |
| 5,305,452 | 4/1994 | Kahn et al. | 395/550 |
| 5,309,561 | 5/1994 | Overhouse et al. | 395/200.19 |
| 5,319,772 | 6/1994 | Hwang | 395/550 |
| 5,381,543 | 1/1995 | Blomgren et al. | 395/550 |
| 5,418,969 | 5/1995 | Matsuzaki et al. | 395/750 |
| 5,432,468 | 7/1995 | Moriyama et al. | 327/152 |
| 5,448,715 | 9/1995 | Lelm et al. | 395/550 |
| 5,450,574 | 9/1995 | Madter et al. | 395/550 |
| 5,485,602 | 1/1996 | Ledbetter, Jr. et al. | 395/550 |
| 5,511,203 | 4/1996 | Wisor et al. | 395/750 |
| 5,537,582 | 7/1996 | Draeger | 395/550 |

Primary Examiner—Jack B. Harvey
Assistant Examiner—Sumati Lefkowitz
Attorney, Agent, or Firm—Harry M. Weiss; Jeffrey D. Moy; Harry M. Weiss & Associates, P.C.

[57] ABSTRACT

A method for maximizing the performance versus the power consumption of a computer system. The method uses a CPU which has the ability to select an optimum external to internal clock frequency ratio. By changing the external to internal clock frequency ratio, the computer system is able to decrease the internal clock frequency in order to conserve power, while allowing the external clock frequency to be at an optimum level in order to maintain maximum system performance.

9 Claims, 1 Drawing Sheet

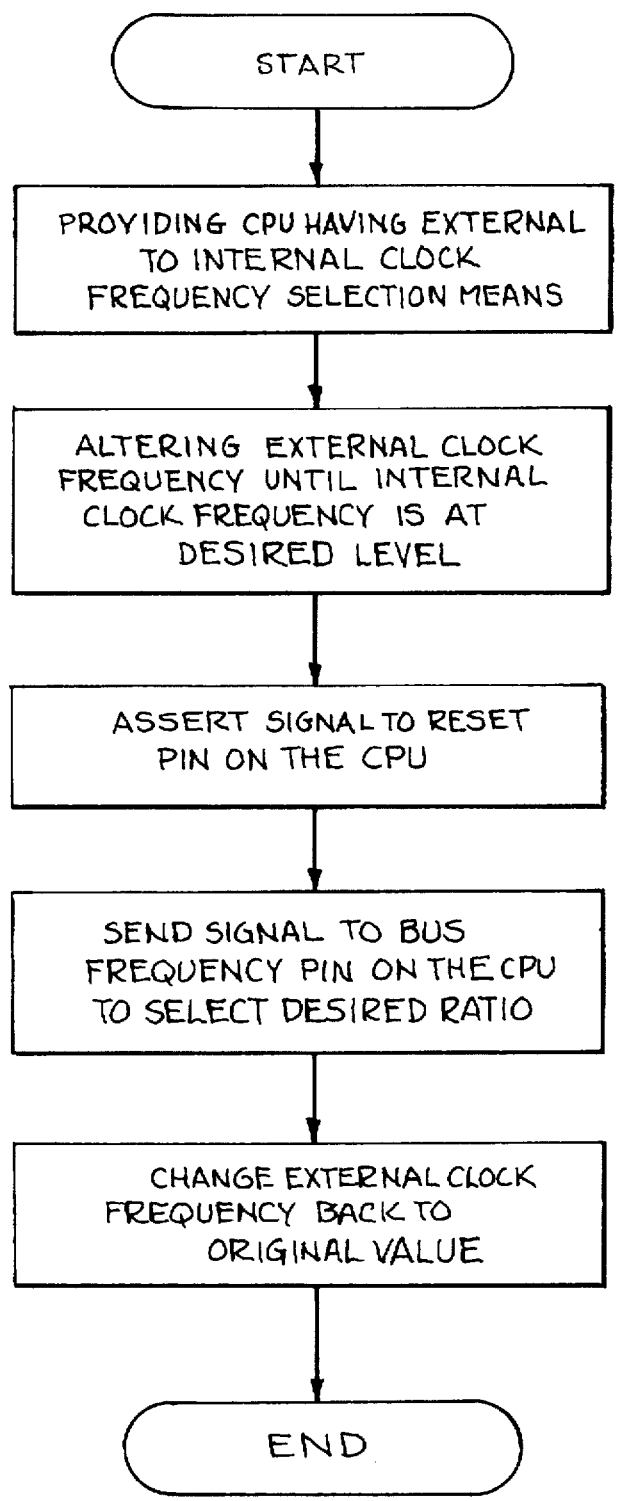
Figure

METHOD FOR OPTIMIZING PERFORMANCE VERSUS POWER CONSUMPTION USING EXTERNAL/ INTERNAL CLOCK FREQUENCY RATIOS

BACKGROUND OF THE INVENTION

1. Field of the Invention

This invention relates to computer systems and, more specifically, to a method for maximizing the performance versus the power consumption of a computer system by altering an external to internal clock frequency ratio.

2. Description of the Prior Art

In computer systems, specifically mobile battery operated computer systems, it is desirable to maximize the overall performance of the system with respect to the power consumed. By increasing the operating frequency of the computer system, the overall performance of the computer system will increase. A problem arises by increasing the operating frequency of the computer system since higher operating frequencies require more power to be consumed by the computer system. This in turn reduces the life of the battery which supplies power to the computer system.

In the past, in order to conserve power and increase the life of the battery, the clock frequency signal to the Central Processing Unit (CPU) would be reduced when the activity of the CPU decreased. However, reducing the clock frequency signal to the CPU would also reduce the performance of the rest of the computer system since the rest of the computer system would be using the same clock signal that the CPU was using. Recently, computer systems have been developed which allow the bus controller and the microprocessor of the computer system to operate at different clock frequencies (See Kahn et al.; U.S. Pat. No. 5,305,452). A problem with this type of computer system is that they require additional hardware to implement. In mobile computer systems, the amount of space is extremely limited. Thus, the requirement of additional hardware makes these systems impractical to implement in a mobile computer system.

Therefore, a need existed to provide a method to maximize the performance versus the power consumption in a computer system. The method must allow the CPU to operate at different frequencies from the rest of the computer system. The method must also not require additional hardware to be installed in order to implement the method.

SUMMARY OF THE INVENTION

In accordance with one embodiment of the present invention, it is an object of the present invention to provide a method for maximizing the performance versus the power consumption of a computer system.

It is another object of the present invention to provide a method for maximizing the performance versus the power consumption of a computer system which allows the CPU to operate at different frequencies from the rest of the computer system.

It is still another object of the present invention to provide a method for maximizing the performance versus the power consumption of a computer system that does not require additional hardware to be installed.

BRIEF DESCRIPTION OF THE PREFERRED EMBODIMENTS

In accordance with one embodiment of the present invention a method for maximizing the performance versus the power consumption of a computer system is disclosed. The method comprises the steps of: providing a CPU coupled to the computer system and having means for selecting an external to internal clock frequency ratio; and altering the means for selecting an external to internal clock frequency ratio to a desired external to internal clock frequency ratio based on the activity of the computer system thereby lowering the power consumption of the computer system while maintaining maximum performance of the computer system. The step of altering the means for selecting an external to internal clock frequency ratio further comprises the step of altering an internal clock frequency to a desired internal clock frequency. In order to alter the internal clock frequency, the external clock frequency is altered from a starting external clock frequency to an external clock frequency having a corresponding internal clock frequency at the desired internal clock frequency for the current external to internal clock frequency ratio. The means for selecting an external to internal clock frequency ratio is then changed to the desired external to internal clock frequency ratio. This is accomplished by sending a signal to a RESET pin on the CPU. A signal is then sent to a BUS FREQUENCY pin of the CPU in order to select the desired external to internal clock frequency ratio. The external clock frequency is then changed back to the starting external clock frequency.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The figure is a flow diagram depicting the method of the present invention for maximizing the performance versus the power consumption of a computer system.

DETAILED DESCRIPTION OF THE PREFERRED EMBODIMENT

Referring to the figure, a flow diagram depicting the steps involved for maximizing the performance versus the power consumption of a computer system is shown. It should be noted that the same method could be used in a computer system to maximize the performance versus the CPU temperature ratio where CPU thermal management is required.

A key step in the method is to provide a CPU which has the ability to select an external to internal clock frequency ratio. In the preferred embodiment of the present invention, an INTEL PENTIUM CPU is used which has a power-on reset option of selecting the external to internal clock frequency ratio. One specific type of CPU used is the INTEL PENTIUM 815/100. The PENTIUM 815/100 allows the external to internal clock frequency ratio to be either one to two (1/2) or two to three (2/3). This means that with an external clock frequency operating at a maximum frequency of 50 Mhz, the maximum internal clock frequency of the CPU is either 100 Mhz for the 1/2 ratio or 75 Mhz for the 2/3 ratio.

In order to conserve power or for thermal management reasons, the external to internal clock frequency ratio may be changed to lower the internal clock frequency of the CPU. The lowering of the internal clock frequency requires the external clock frequency to be reduced.

Under the preferred embodiment of the present invention, if the external clock frequency is operating at a maximum value of 50 Mhz, the internal clock frequency will have a maximum value of 100 Mhz for the external to internal clock frequency ratio of 1/2. To reduce the internal clock frequency, the external clock frequency must first be reduced from the maximum value of 50 Mhz. There are several ways to reduce the external clock frequency. One way is use the stop clock protocol of the CPU. Another way is to change the external clock frequency slowly so as to not go outside of the CPU's specifications. The frequency needs to be changed slowly to allow the CPU to track the changes. When the external clock frequency reaches 37.5 Mhz, the external to internal clock frequency ratio must be changed from 1/2 to 2/3. The external to internal clock frequency ratio is then changed by sending a signal to a RESET pin of the CPU. A signal is then sent to a BUS FREQUENCY pin of the CPU to select the desired external to internal clock frequency ratio. The external clock frequency is then increased back to 50 Mhz. It should be noted that in order to change the BUS FREQUENCY pin and the external clock frequency, a RESET specification needs to be followed. This requires that the CPU be placed in RESET and that the external clock be placed at 50 Mhz for the certain length of time so as to lock on to the frequency.

The above method allows the memory system of the computer (which operates under the external clock frequency) and the CPU interface logic (which operates under the external clock frequency) to operate at the optimized 50 Mhz clock frequency while the internal clock frequency of the CPU is lowered to a maximum value of 75 Mhz. This allows the computer system to save power and increase the life of the battery, as well as to maximize the performance of the computer system since the CPU will be operating at a lower frequency during times of inactivity while the rest of the computer system may still operate at the optimize frequency of 50 Mhz.

While the invention has been particularly shown and described with reference to preferred embodiments thereof, it will be understood by those skilled in the art that the foregoing and other changes in form and details may be made therein without departing from the spirit and scope of the invention.

I claim:

1. A method for maximizing performance versus power consumption in a computer system comprising the steps of:

providing a Central Processing Unit (CPU) coupled to said computer system wherein said CPU has means for selecting an external to internal clock frequency ratio; and altering said means for selecting an external to internal clock frequency ratio within said CPU to a desired external to internal clock frequency ratio based on activity of said computer system to lower the power consumption by said CPU and therefor power consumption of said computer system while maintaining maximum performance of said computer system.

2. The method of claim 1 wherein said step of altering said means for selecting an external to internal clock frequency ratio further comprises the step of altering an internal clock frequency of said computer system to a desired internal clock frequency.

3. The method of claim 2 wherein said step of altering an internal clock frequency to a desired internal clock frequency further comprises the steps of:

altering an external clock frequency from a starting external clock frequency to an external clock frequency having a corresponding internal clock frequency at said desired internal clock frequency for a current external to internal clock frequency ratio;

changing said means for selecting an external to internal clock frequency ratio to said desired external to internal clock frequency ratio; and changing said external clock frequency back to said starting external clock frequency.

4. The method of claim 1 wherein said step of changing said means for selecting an external to internal clock frequency ratio further comprises the steps of:

asserting a signal to a RESET pin of said CPU; and sending a signal to a BUS FREQUENCY pin of said CPU to select said desired external to internal clock frequency ratio.

5. The method of claim 1 wherein said step of providing a CPU having means for selecting an external to internal clock frequency ratio further comprises the step of providing an INTEL PENTIUM type CPU having a power-on reset means for selecting an external to internal clock frequency ratio.

6. The method of claim 1 wherein said means for selecting an external to internal clock frequency ratio has external to internal frequency clock ratios of one to two (1/2) and two to three (2/3).

7. A method for maximizing performance versus power consumption in a computer system comprising the steps of:

providing a CPU coupled to said computer system and having means for selecting an external to internal clock frequency ratio; and altering an internal clock frequency of said computer system to a desired internal clock frequency, said step of altering said internal clock frequency comprising the steps of:

altering an external clock frequency from a starting external clock frequency to an external clock frequency having a corresponding internal frequency set at said desired internal clock frequency at a current external to internal clock frequency ratio;

changing said means for selecting an external to internal clock frequency ratio to said desired external to internal clock frequency ratio, said step of changing said means for selecting an external to internal clock frequency ratio comprising the steps of:

asserting a signal to a RESET pin on said CPU;

sending a signal to a BUS FREQUENCY pin of said CPU to select said desired external to internal clock frequency ratio; and changing said external clock frequency back to said starting external clock frequency.

8. The method of claim 7 wherein said step of providing a CPU having means for selecting an external to internal clock frequency ratio further comprises the step of providing an INTEL PENTIUM type CPU having a power-on reset means for selecting an external to internal clock frequency ratio.

9. The method of claim 7 wherein said means for selecting an external to internal clock frequency ratio has external to internal frequency clock ratios of one to two (1/2) and two to three (2/3).

* * * * *